(12) United States Patent
Coroy et al.

(10) Patent No.: US 7,697,121 B1
(45) Date of Patent: Apr. 13, 2010

(54) SENSING SYSTEM HAVING WAVELENGTH REFLECTORS THAT RECEIVE MODULATED LIGHT SIGNALS

(75) Inventors: Trenton Gary Coroy, Niverville (CA); Bernard Thomas Smith, Sierra Madre (CA)

(73) Assignee: Kotura, Inc., Monterey Park, CA (US)

( * ) Notice: Subject to any disclaimer, the term of this patent is extended or adjusted under 35 U.S.C. 154(b) by 481 days.

(21) Appl. No.: 11/292,317

(22) Filed: Nov. 30, 2005

(51) Int. Cl.
*G01B 9/02* (2006.01)
(52) U.S. Cl. .................... 356/35.5; 356/478
(58) Field of Classification Search .............. 356/32, 356/35.5, 478; 250/227.23, 227.27; 385/12
See application file for complete search history.

(56) References Cited

U.S. PATENT DOCUMENTS

| | | | | | |
|---|---|---|---|---|---|
| 4,543,133 | A | * | 9/1985 | Mukai | 117/73 |
| 5,793,907 | A | * | 8/1998 | Jalali et al. | 385/24 |
| 5,991,026 | A | * | 11/1999 | Kluth et al. | 356/478 |
| 6,195,162 | B1 | * | 2/2001 | Varnham et al. | 356/478 |
| 6,269,198 | B1 | * | 7/2001 | Hodgson et al. | 385/13 |
| 6,417,507 | B1 | * | 7/2002 | Malvern et al. | 250/227.14 |
| 6,640,647 | B1 | * | 11/2003 | Hong et al. | 250/227.27 |
| 2001/0013934 | A1 | * | 8/2001 | Varnham et al. | 356/478 |

OTHER PUBLICATIONS

T. Coroy. Bragg fiber optic sensing systems for structural sensing. In OSA *Trends in Optics and Photonics vol. 23, Symposium on Electro-Optics: Present and Future*, pp. 65-74. Optical Society of America, Washington, DC, 1998.
R. M. Lane. Seeing the light with advanced optical network management. Lightwave web exclusive, Aug. 2003.
R. M. Measures. Smart composite structures with embedded sensors. *Composites Engineering*, 2:597-618, 1992.
R. M. Measures, S. Melle, and K. Liu. Wavelength demodulated Bragg grating fiber optic sensing systems for addressing smart structure critical issues. *Smart Mater. Struct.*, 1:36-44, 1992.

(Continued)

*Primary Examiner*—Patrick J Connolly
(74) *Attorney, Agent, or Firm*—Gavrilovich, Dodd & Lindsey, LLP

(57) ABSTRACT

The sensing system includes a plurality of modulators that are each configured to modulate a different light signal. The sensing system also includes optical pathways that transport the modulated light signals to one or more wavelength reflectors. Each wavelength reflector is configured to reflect a portion of the modulated light signals at a characteristic wavelength that is a function of an influence external to the wavelength reflector. The sensing system also includes a light sensor configured to receive the reflected light signals and to output a modulated electrical signal that is a function of the power of each of the reflected light signals. The sensing system can also include electronics configured to employ the modulated electrical signal so as to determine one or more results selected from a group consisting of: the characteristic wavelength of one or more of the wavelength reflectors and a level of the external influence on one or more of the wavelength reflectors. Examples of external influences include, but are not limited to, strain, stress, temperature, and properties of materials contacting the wavelength reflector such as index of refraction or pH.

22 Claims, 4 Drawing Sheets

OTHER PUBLICATIONS

S. M. Melle, A. T. Alavie, S/ Karr, T. Coroy, K. Liu, and R. M. Measures. A Bragg grating-tuned fibre laser strain sensor system. *IEEE Photon. Technol. Lett.*, 5:263-266, 1993.

Y. Sano and T. Yoshino. Fast optical wavelength interrogator employing arrayed waveguide grating for distributed fiber Bragg grating sensors. *J. Lightwave Technol.*, 21:132-139, 2003.

N. A. Trickey, R. Lane. Advanced optical layer management: Now you can see the light. Tropic Networks White Paper, 2003.

G. Z. Xiao, P. Zhao, F. Sun, Z. Lu, and Z. Zhang. Arrayed-Waveguide-Grating-Based Interrogator for Wavelength-Modulated Multi-Fiber-Optic Sensor Applications. *IEEE Photon. Technol. Lett.*, vol. 17, No. 8, pp. 1710-1712, Aug. 2005.

\* cited by examiner

SENSING SYSTEM HAVING WAVELENGTH REFLECTORS THAT RECEIVE MODULATED LIGHT SIGNALS

FIELD

The present invention relates to sensing systems and more particularly to sensing systems that include wavelength reflectors.

BACKGROUND

Optical Fiber Bragg Grating Sensing Systems have been employed to monitor strain for a variety of different applications such as monitoring the strain on civil structures including bridges and dams. These sensors typically include an optical fiber with a Bragg Grating. A Bragg Grating reflects light with wavelengths at a characteristic wavelength known as the Bragg wavelength and passes other wavelengths of light. The Bragg wavelength shifts in response to changes in the level of strain on the Bragg Grating. As a result, the sensing system can determine the level of strain on the Bragg Grating from the Bragg wavelength. These sensing systems often include tunable, narrow-linewidth light sources such as tunable lasers to generate light signals that are reflected by the Bragg Grating. Alternately, these sensing systems may include a broadband light source, and use a demultiplexer to demultiplex the reflected light signals. In this case, each of the demultiplexed light signals is received at a different photodetector. These components increase the cost, size and/or complexity of the Optical Fiber Bragg Grating Sensing System. As a result, there is a need for an improved Optical Fiber Bragg Grating Sensing System.

SUMMARY

A sensing system is disclosed. The sensing system includes a plurality of modulators that are each configured to modulate a different light signal. The sensing system also includes optical pathways that transport the modulated light signals to one or more wavelength reflectors. Each wavelength reflector is configured to reflect a portion of the modulated light signals at a characteristic wavelength that is a function of an influence external to the wavelength reflector. The sensing system also includes a light sensor configured to receive the reflected light signals and to output a modulated electrical signal that is a function of the power of each of the reflected light signals. The sensing system can also include electronics configured to employ the modulated electrical signal so as to determine one or more results selected from a group consisting of: the characteristic wavelength of one or more of the wavelength reflectors and a level of the external influence on the one or more of the wavelength reflectors. Examples of external influences include, but are not limited to, strain, stress, temperature, and index of refraction or pH of materials contacting the wavelength reflector. The wavelength reflectors can be Bragg gratings.

In some instances, the system includes one or more reference wavelength reflectors that each reflects light at a characteristic wavelength that is a known function of an unwanted external influence on the sensing system. The electronics can be configured to employ the modulated electrical signal to extract the effects of the unwanted external influence from the determined result. In some instances, the system generates light signals having wavelengths that do not fall within the range of possible characteristic wavelengths for any of the wavelength reflectors. The electronics can be configured to employ these light signals to correct for broadband reflections in the sensing system. These broadband reflections can result from poor fiber connectors or improperly terminated sensing fiber ends where reflections have not been fully suppressed.

One embodiment of the sensing system includes a demultiplexer configured to receive a broadband light signal and to demultiplex it into a plurality of light signals. The sensing system also includes a plurality of modulators. Each modulator is configured to modulate a different light signal so as to generate a modulated light signal. The sensing system also includes a multiplexer configured to multiplex the modulated light signals. The sensing system also includes an optical path having one or more wavelength reflectors that receive the multiplexed light signals. Each wavelength reflector is configured to reflect a portion of the modulated light signals having wavelengths at a characteristic wavelength that is a function of an external influence on the wavelength reflector. The sensing system includes a light sensor configured to receive the reflected light signals and to output a modulated electrical signal that is a function of the power of each of the reflected light signals. The sensing system further comprises electronics configured to apply a different modulation signal to each of the modulators to modulate the light signals, and also configured to employ the modulated electrical signal so as to determine the characteristic wavelength of one or more of the wavelength reflectors and/or a level of the external influence on the one or more of the wavelength reflectors.

Methods of operating and generating the sensing system are also disclosed. Electronics for operating the sensing system are also disclosed.

BRIEF DESCRIPTION OF THE FIGURES

FIG. 3D is a cross section of a portion of an optical device having an optical attenuator suitable for use as a modulator in the optical device illustrated in FIG. 3A.

DESCRIPTION

Figure 1:
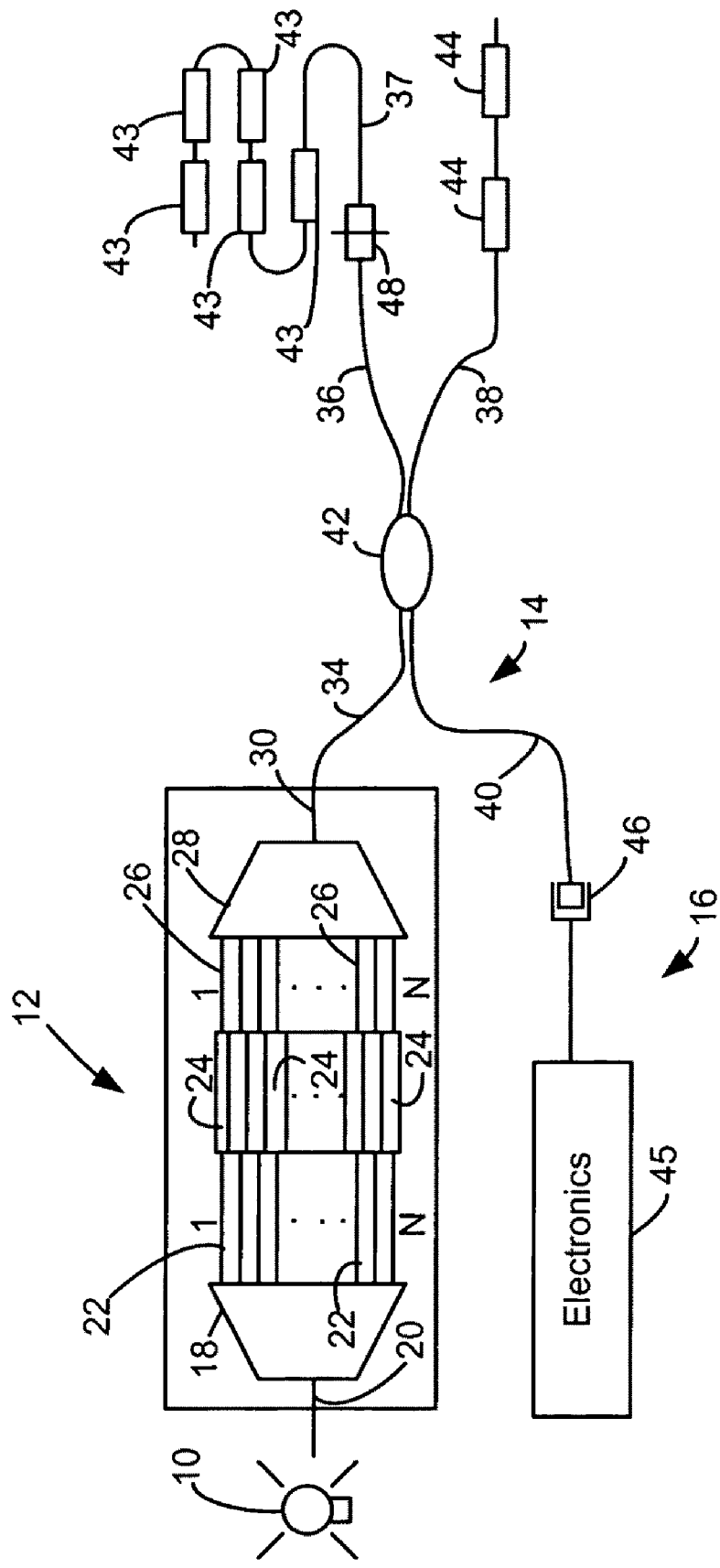
FIG. 1 is a schematic diagram of the sensing system. The sensing system includes a light source, optical components, optical fiber components, and electronics. The optical components include a demultiplexer configured to receive light and output a plurality of light signals. The optical components also include modulators configured to modulate the light signals. The optical fiber components receive the modulated optical signals and transport them to one or more wavelength reflectors that each reflects a portion of the modulated light signals having wavelengths at a characteristic wavelength.

A sensing system is disclosed. The sensing system includes electronics configured to modulate or encode different light signals before the light signals are transmitted along an optical pathway to one or more wavelength reflectors. The wavelength reflectors are each configured to reflect light at a characteristic wavelength that is a function of one or more external influences on the wavelength reflector. Examples of external influences include, but are not limited to, levels of strain, temperature, and pH of materials contacting the wavelength reflector. As a result, the portion of the modulated light signals that are reflected is a function of the external influence on the one or more wavelength reflectors. The reflected light signals are received at a light sensor where they are converted to a modulated electrical signal that is a function of the power of each of the reflected light signals. The electronics process the modulated electrical signal so as to determine the characteristic wavelength of one or more of the wavelength reflectors and/or to determine the level of the external influence on one or more of the wavelength reflectors.

The modulation scheme allows the sensing system to use a plurality of different wavelength reflectors. These wavelength reflectors can be concurrently positioned at a variety of different locations. As a result, the sensing system permits the concurrent monitoring of external influences at a variety of locations and/or the characteristic wavelength of wavelength reflectors at a variety of different locations.

The reflected light signals need not be optically demultiplexed after reflection by a wavelength reflector because the electronics makes use of the modulation protocol to determine the characteristic wavelength or level of the external influence. As a result, an optical demultiplexer need not be positioned after the wavelength reflectors. Further, a single light sensor can provide the functions that were previously provided by a plurality of light sensors. The sensing system also employs a broadband light source, rather than a wavelength tunable narrow-linewidth source such as a tunable laser. For the above reasons, the sensing system has a reduced cost and complexity relative to prior sensing systems.

A plurality of the optical components employed by the sensing system can be integrated on a single optical device. For instance, the optical device can include a demultiplexer that receives and demultiplexes the light signals from the light source. The optical device can also include a plurality of optical modulators that each modulates a demultiplexed light signal. The optical device can further include a multiplexer for combining the modulated light signals into a single optical path. The demultiplexer, the modulators, and the multiplexer can be integrated on a single optical chip. Additionally, these components can be fabricated in a silicon platform that provides enhanced modulator speeds and response times.

FIG. 1 is a schematic diagram of the sensing system. The sensing system includes a light source 10, an optical component 12, an optical fiber component 14, and electronics 16. A suitable light source 10 includes a broadband light source 10 such as a Light Emitting Diode (LED), a Super-Luminescent Diode (SLD) or an amplified spontaneous emission (ASE) source.

The optical component 12 illustrated in FIG. 1 includes a demultiplexer 18 configured to receive light from an input waveguide 20. The demultiplexer 18 is configured to separate the light into a plurality of uncoded light signals. A plurality of uncoded signal waveguides 22 are each configured to receive an uncoded light signal from the demultiplexer 18 and transport it to a modulator 24. The modulators 24 are each configured to encode a light signal. A plurality of encoded signal waveguides 26 are each configured to receive an encoded light signal from a modulator 24 and transport it to a multiplexer 28. The multiplexer 28 is configured to combine the encoded light signals onto a single optical path. An output waveguide 30 is configured to receive the encoded light signals from the multiplexer 28.

A suitable demultiplexer 18 includes an arrayed waveguide grating, free space diffraction grating, Echelle grating, and thin film filter demultiplexers. A suitable multiplexer 28 includes an arrayed waveguide grating, free space diffraction grating, Echelle grating, and thin film filter multiplexers. Suitable modulators 24 include, but are not limited to, phase modulators 24, and intensity modulators 24. An example of a suitable intensity modulator 24 includes, but is not limited to, free-carrier absorption based variable optical attenuators, Mach-Zehnder type modulators 24 and an electro-absorption type modulators 24.

The optical fiber components 14 include an input fiber 34, a primary sensor fiber 36, a secondary sensor fiber 37, a reference fiber 38, and an output fiber 40 that each carry light signals to and/or from an optical coupler 42. A suitable optical coupler 42 includes, but is not limited to, a 3 dB Fiber Coupler. The secondary sensor fiber 37 includes one or more wavelength reflectors 43 configured to reflect light traveling along the secondary sensor fiber 37 with wavelengths at a characteristic wavelength. Reflection of light at a characteristic wavelength can include reflection of a distribution of light that includes the characteristic wavelength. For instance, the distribution of light can be centered at the characteristic wavelength or the characteristic wavelength may be the most intense wavelength in the distribution of light. Since each wavelength reflector can reflect light at a different characteristic wavelength, each wavelength reflector 43 is associated with a characteristic wavelength. Although each of the wavelength reflectors is shown positioned along a single optical fiber, the wavelength reflectors can be positioned along more than one optical fiber. For example, couplers, splitters and/or optical switches may be used to create a network of sensor fibers 37; or an optical coupler 42 which connects to more than one primary sensing fibers 36 can be used, where each fiber 36 may connect to a secondary sensor fiber 37.

The reference fiber 38 has one or more reference wavelength reflectors 44 configured to reflect light traveling along the reference fiber 38 with wavelengths at a characteristic wavelength. Accordingly, each reference wavelength reflector 44 is also associated with a characteristic wavelength. Although each of the reference wavelength reflectors is shown positioned along a single optical fiber, the reference wavelength reflectors can be positioned along more than one optical fiber. For example, couplers, splitters and/or optical switches may be used to create a network of reference fibers 37; or an optical coupler 42 which connects to more than one reference fibers 38 can be used. Additionally, one or more of the reference wavelength reflectors can be positioned on a primary sensing fiber 36.

Suitable wavelength reflectors 43 and reference wavelength reflectors 44 include, but are not limited to, fiber Bragg gratings and waveguide Bragg gratings. A Bragg grating can be formed in an optical fiber or waveguide by modulating the index of refraction of the optical fiber or waveguide along a section of its length. The characteristic wavelength of a Bragg grating is also known as the Bragg wavelength.

The electronics 16 include a controller 45 in electrical communication with a light sensor 46. A suitable light sensor 46 includes, but is not limited to, one or more photodetectors, one or more photodiodes, and one or more avalanche photodiodes, charge coupled devices (CCDs), and photomultiplier tubes. A suitable light sensor 46 may also include optical components such as splitters or couplers and optical delay elements. A suitable controller 45 includes one or more processors. Suitable processors include, but are not limited to, firmware, hardware and software or a combination thereof. Examples of suitable controllers 45 include, but are not limited to, analog electrical circuits, digital electrical circuits, programmed general purpose digital computers, processors, microprocessors, digital signal processors (DSPs), computers, microcomputers, integrated circuits, application specific integrated circuits (ASICs), logic gate arrays, switching arrays, and discrete electrical components, or combinations suitable for performing the required control functions. The electronics 16 can optionally include one or more machine-readable media for storing instructions to be executed by the electronics and/or for storing information to be used by the electronics while executing instructions. The instructions can be instructions for executing the methods and functions attributed to the electronics. Suitable machine-readable media include, but are not limited to, RAM, disk drives, optical discs such as a compact disk (CD), CD-ROM, CD-R (a recordable CD-ROM that can be read on a CD-ROM drive), CD-RW (multiple-write CD), CD-E (recordable and erasable CD), or DVD (digital video disc). Alternatively, instead of, or in addition to an optical disc, the machine readable media can include one or more of the following: a magnetic data storage diskette (floppy disk), a Zip disk, DASD storage (e.g., a conventional "hard drive" or a RAID array), magnetic tape, RAM, electronic read-only memory (e.g., ROM, EPROM, or EEPROM), paper punch cards, or transmission media such as digital and/or analog communication links.

Although FIG. 1 illustrates the use of optical fibers for transporting light signals, other optical pathways can be employed in place of one or more of these optical fibers. For instance, free space can be used, and planar waveguides or other light guiding media can be employed. Additionally, one or more of these optical pathways can be integrated into the optical components and/or optical devices, as can other system elements such as for example the coupler 42, the reference wavelength reflectors 44 and the optical source 10.

Figure 2:
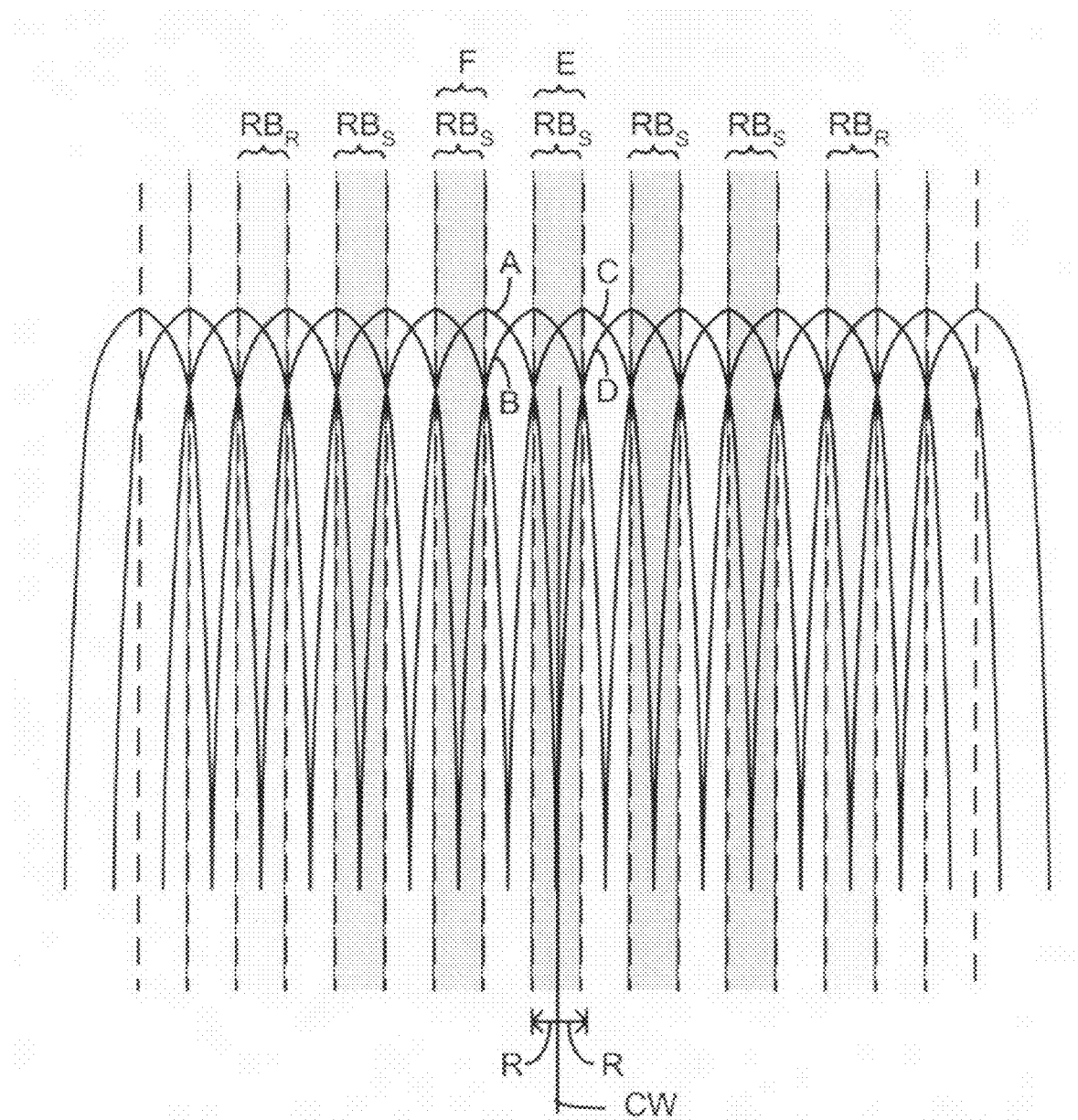
FIG. 2 illustrates an example of the relationship between the light signals and the possible wavelength ranges for the characteristic wavelengths of the wavelength reflectors.

FIG. 2 illustrates an example of the relationship between the light signals and the assigned range of characteristic wavelengths for each wavelength reflector 43. The assigned range of characteristic wavelengths need not represent the limits of the operational capabilities of the wavelength reflector and may simply be the range of wavelengths that are assigned to that wavelength reflector during the normal operation of the sensing system. The arced lines represent the passbands of the demultiplexer 18. The bandpass shape may be Gaussian, linear, or any arbitray function. Accordingly, the arced lines can represent the light signals that can be generated by the demultiplexer 18. The intensity of the light signal increases moving upward along the page and the wavelength increases moving to the right along the page. The characteristic wavelength associated with a particular wavelength reflector can shift over a range of wavelengths. A pair of dashed vertical lines labeled $RB_S$ or $RB_R$ illustrates the possible range of characteristic wavelengths associated with each wavelength reflector. The wavelength ranges labeled $RB_S$ are each associated with a wavelength reflector 43 on the secondary sensor fiber 37 of FIG. 1. The wavelength ranges labeled $RB_R$ are each associated with a reference wavelength reflector 43 on the reference fiber 38 of FIG. 1.

The wavelength ranges labeled $RB_S$ or $RB_R$ are associated with wavelength reflectors 43 and reference wavelength reflectors 44 respectively, and are overlapped by at least two light signals. The light signals that overlap a wavelength range in FIG. 2 will be partially reflected by the wavelength reflector or reference wavelength reflector associated with that wavelength range. For example, when an external influence on a wavelength reflector changes, the characteristic wavelength of that wavelength reflector shifts within the associated wavelength range. The line labeled CW in FIG. 2 can represent the characteristic wavelength of the wavelength reflector associated with the wavelength range labeled E. In response to changes in an external influence, this characteristic wavelength can move between the dashed lines that define the wavelength range labeled E as illustrated by the arrows labeled R. As is evident from FIG. 2, the power ratio (the power of one light signal after being reflected: the power of another light signal after being reflected) of two different light signals (in this case signals B and C) that are reflected by a wavelength reflector changes in response to changes in characteristic wavelength. As a result, the power ratio changes as a function of the characteristic wavelength. Accordingly, a relationship between this power ratio and the characteristic wavelength can be generated. The relationship can be experimentally determined in order to calibrate the sensing system. A particular power ratio can be compared to the associated relationship to determine the characteristic wavelength of the associated wavelength reflector.

The light signals that are suitable for use with a particular wavelength reflector or reference wavelength reflector preferably have a range of wavelengths that completely overlap the wavelength range associated with that wavelength reflector or reference wavelength reflector. For instance, the light signals labeled B and C are preferably used in conjunction with the wavelength reflector associated with the wavelength range labeled E. Two of the light signals do not overlap with any of the wavelength ranges. These light signals are used to monitor broadband reflection levels.

Although FIG. 2 is disclosed in the context of a plurality of light signals that overlap a wavelength range, the sensing system can employ a single light signal overlapping a wavelength range to determine the characteristic wavelength of the associated wavelength reflector. For example, the line labeled CW in FIG. 2 can represent the characteristic wavelength of the wavelength reflector associated with the wavelength range labeled E. As is evident from FIG. 2, the power of light signal B changes in response to changes in characteristic wavelength. As a result, the power of light signal B changes as a function of the characteristic wavelength. Accordingly, a relationship between the power of light signal B and the characteristic wavelength can be generated. The relationship can be experimentally determined in order to calibrate the sensing system. The system can determine the power of light signal B and compare the power to the associated relationship to determine the characteristic wavelength of the associated wavelength reflector. Although it is possible to employ a single light signal to determine the characteristic wavelength, use of a plurality of signals and a power ratio may be preferred as it may remove or reduce some system errors.

During operation of a sensing system constructed according to FIG. 1 and FIG. 2, the light source 10 produces a light signal that is received by the input waveguide 20. The input waveguide 20 transports the light signal to the demultiplexer 18, which separates the light signal into a plurality of light signals. The uncoded signal waveguides 22 each carry a different light signal to a modulator 24. The electronics 16 apply a modulation signal to each of the modulators 24 so as to encode each of the uncoded light signals. In some instances, the modulators operate independently so that the modulators could be operated in a time sequence (one or a few operate while the others are off) or all operated simultaneously. The encoding scheme may be any set of orthogonal functions such as sinusoids of different frequency or same frequency at different phase or a combination. An example of a suitable modulation signal is a voltage varying sinusoid. Other examples are square wave or a saw-tooth wave may also be used. Alternately, the modulation signal can also be a pseudo-random square wave having an amplitude that varies with time and where the period of time that the signal has a particular amplitude represents a digital value of the code or a code signal such as the code signal employed in a code division multiple access (CDMA) coder. When the modulator is an intensity modulator such as variable optical attenuator, a voltage varying modulation signal results in intensity modulation of a light signal. The electronics can include one or more signal generators for generating the modulation signals applied to the modulators. Additionally, the modulation signal applied to each modulator 24 can be different so each light signal is encoded differently.

The encoded signal waveguides 26 each transport an encoded light signal from a modulator 24 to the multiplexer 28, which combines the encoded light signals into a single optical path. An output waveguide 30 transports the encoded light signals to the optical fiber components 14. The input fiber 34 receives the encoded light signals and transports them to the coupler. The primary sensor fiber 36 and the secondary sensor fiber 37 carry a first portion of the encoded light signals from the coupler to the one or more wavelength reflectors 43. Each wavelength reflector 43 reflects particular wavelengths which are a function of one or more external influences on that wavelength reflector 43. The secondary sensor fiber 37 and primary sensor fiber 36 carry the reflected signals back to the coupler. The output fiber 40 carries a portion of the reflected signals, which includes portions of at least two or more encoded light signals, to the electronics 16.

The light sensor 46 receives the reflected signals and outputs an encoded electrical signal. The encoded electrical signal is a function of the power of each of the reflected light signals. Because each of the reflected light signals is modulated with a different modulation signal, the electronics 16 can employ the modulation signals in combination with standard processing techniques to extract the amplitude, phase and/or power of a particular reflected light signal from the encoded electrical signal and/or to extract the relative powers of reflected light signals from the encoded electrical signal. For instance, the electronics 16 can employ a fast Fourier transform (FFT), digital filtering, or synchronous detection in extracting the amplitude, phase and/or power of the reflected light signals and/or the relative power of the reflected light signals from the encoded electrical signal. When the modulation signal is a pseudo-random amplitude varying wave, the electronics 16 can employ the pseudo-random amplitude varying wave to extract the power of the reflected light signals and/or the relative power of the reflected light signals from the encoded electrical signal. For instance, when the modulation signal is a signal such as the code signal employed in a code division multiple access (CDMA) coder, the electronics 16 can effectively function as a CDMA decoder when extracting the power of the reflected light signals from the encoded electrical signal.

In some instances, the electronics extract the contribution to the encoded electrical signal from each of the encoded light signals or from each of the wavelength reflectors. For instance, the electronics can separate the encoded electrical signal into a plurality of electrical signals that are each associated with one of the light signals or that are each associated with one of the wavelength reflectors. In one example, each of the modulation signals is a sinusoidal signal having a different frequency or each of the modulation signals for light signals associated with the same wavelength reflectors has the same frequency but modulation signals for light signals associated with different wavelength reflectors have different frequencies. The electronics 16 includes a plurality of filters that each filter out a different frequency and phase. In some instances, the phase may be automatically optimized with additional phase delay to account for the time delay between the modulation signal and the return of the reflected signal. The frequency of each filter can correspond to the frequency of a modulation signal. Accordingly, the electrical signal output by each filter will correspond to the light signal that was modulated using the modulation signal having a frequency in the bandwidth of the filter. The amplitude of the electrical signal output by the filters will be related to the power of the reflected light signals. As a result, the electronics can employ these electrical signals to determine the power of each reflected light signal.

The electronics 16 can extract a power and phase delay from the encoded electrical signal for each of the encoded light signals or for each of the wavelength reflectors. The phase delay is related to the time delay between the modulation signal and the return of the reflected signal. The powers may also be a function of the characteristics of the modulation signal. For example, the extracted powers may be normalized to a particular modulation depth, so that changes in the modulation depth of a modulation signal do not affect the value of the associated extracted power. A reference light sensor may also be used to monitor the encoded light signals prior to reflection from wavelength reflectors or reference wavelength reflectors. For instance, a tap can be used to extract a portion of these light signals at a location after the multiplexer and transport that portion to a reference light sensor. When a reference light sensor is used, the powers extracted from the encoded electrical signal may also be a function of a reference encoded electrical signal from the reference light source. For example, the extracted powers from the light sensor may be normalized to extracted powers from the reference light sensor, so that any changes in the intensity or modulation depth of a light signal do not affect the value of the associated extracted power.

In addition or as an alternative to employing the power of the encoded electrical signal, the electronics can make use of the phase of the encoded light signal. For instance, two light signals overlapping the wavelength range of a particular wavelength reflector as disclosed in FIG. 2 can be modulated using modulation signals with the same amplitude and frequency but 180° out of phase. When the characteristic wavelength of the wavelength reflector is such that the power of the reflected light signals is the same, the electrical signal associated with that wavelength reflector has an amplitude of zero. As the characteristic wavelength shifts, the powers of the reflected light signals become different from one another and the associated electrical signal develops a non-zero amplitude (at the common modulation frequency). The value of amplitude changes as the difference in the power of the reflected light signals changes. Accordingly, a relationship between the amplitude of the associated electrical signal and the characteristic wavelength can be determined for each of the wavelength reflectors. However, a single amplitude value can be associated with two different characteristic wavelengths. For instance, when the characteristic wavelength is located such that the power of each of the resulting reflected light signals is the same and then shifts to lower wavelengths, the value of the amplitude can be the same as if the characteristic wavelength had shifted to a higher wavelength. As a result, one of the characteristic wavelength values associated with a particular amplitude is from a shift of the characteristic wavelength to a higher wavelength and one of the one of the characteristic wavelength values that is also associated with that amplitude is from a shift of the characteristic wavelength to a lower wavelength. The phase of the associated electrical signal can be employed to determine the direction in which the characteristic wavelength shifted. For instance, when the characteristic wavelength is located such that the power of each of the resulting reflected light signals is the same and then shifts to lower wavelengths, the phase of the associated electrical signal will shift in the opposite direction that the phase will shift if the characteristic wavelength shifted to a higher wavelength. As a result, the phase can indicate whether the characteristic wavelength has the higher wavelength or the lower wavelength. Hence, the electronics can employ the phase of the electrical signal associated with a particular wavelength reflector to select the correct value of the characteristic wavelength for that wavelength reflector.

When the light signals overlapping the wavelength range of a particular wavelength reflector are modulated using unique encoding signals, the electronics can separate the encoded electrical signal into a plurality of electrical signals that are each associated with one of the wavelength reflectors. As disclosed above, the electronics can process the electrical signal or signals associated with a particular wavelength reflector to determine the characteristic wavelength associated with that wavelength reflector.

In some instances, the electronics 16 process the encoded electrical signal to determine the power ratio of different reflected light signals. As noted above, the relationship between the power ratio of particular light signals and the characteristic wavelength of a particular wavelength reflector can be determined. Accordingly, the electronics 16 can determine the power ratio and employ the relationship for that wavelength reflector to determine the characteristic wavelength for that wavelength reflector. As noted above, a relationship between the power of particular light signal and the characteristic wavelength of a particular wavelength reflector can be determined. Accordingly, the electronics 16 can process the encoded electrical signal to determine the power of different reflected light signals. The electronics can compare the determined power to the appropriate relationship to determine the characteristic wavelength for a wavelength reflector. As noted above, a relationship between the amplitude and phase of the electrical signal associated with a particular wavelength reflector and the characteristic wavelength of that wavelength reflector can be determined. Accordingly, the electronics 16 can process the encoded electrical signal to determine the amplitude and phase of different as electrical signals. The electronics can determine the amplitude and phase of a electrical signal associated with a particular wavelength reflector and compare it to the appropriate relationship to determine the characteristic wavelength for that wavelength reflector.

Different wavelength reflectors can be configured to reflect different wavelengths and accordingly different light signals. As a result, different wavelength reflectors may be associated with the power and/or power ratio of different light signals. Further, since the relationship can be different for different wavelength reflectors, different wavelength reflectors can be associated with different relationships. The electronics 16 can use the relationship for each of the different wavelength reflectors to determine the characteristic wavelength for each of the different wavelength reflectors. As a result, different wavelength reflectors can be positioned at different locations and a characteristic wavelength can be determined for each location. The characteristic wavelengths can be determined sequentially or concurrently.

In general, the reflected power of a particular encoded light source will include both reflections from the intended wavelength reflector and some amount of additional reflections from sources other than the intended wavelength reflector. These additional reflections, which might be caused for instance by reflections at the end of a fiber or by a poor fiber connection, are generally broadband in nature. Therefore the encoded light signals can optionally include one or more broadband reflection signals that do not fall within the wavelength range of any wavelength reflectors as noted in the discussion of FIG. 2. The reflected powers for these broadband reflection signals provide a measure of the contribution from these additional reflections. Accordingly, the encoded electrical signal can be a function of the broadband reflection signals in addition to being a function of the reflected light signals.

The electronics 16 can employ the broadband reflection signals to remove or reduce the effect of broadband reflections from the power ratio of a wavelength reflector disclosed above. For instance, the power ratio can be determined as the ratio of: (the power of one light signal after being reflected minus the broadband reflection power):(the power of another light signal after being reflected minus the broadband reflection power). The broadband reflection power can be the same or different for each of the light signals. For instance, when the powers resulting from two or more broadband reflection signals are about the same, the broadband reflection power can be the same. Further, when the sensing system employs a single broadband reflection signal, the electronics can use the power that the electronics determines for that broadband reflection signal for each of the broadband reflection power values. When the powers resulting from two or more broadband reflection signals are different, the broadband reflection power values associated with a particular wavelength can be interpolated from the powers of the different broadband reflection signals. As a result, a different broadband reflection power value can be determined for each of the light signals and these values can be employed in correcting the power ratio for the effect of broadband reflections. Additionally or alternately, the electronics 16 can employ the broadband reflection signals to remove or reduce the effect of broadband reflections from other variables. As noted above, the electronics can employ the power of a single light signal in determining the characteristic wavelength rather than using a power ratio. The electronics can subtract the broadband reflection power from the power of the light signal after being reflected to generate a corrected power that is compared to the appropriate relationship.

As noted above, the sensing system can optionally include one or more reference wavelength reflectors. The reference reflectors can be employed to extract the effects of one or more unwanted external influences on the sensing system. For instance, the reference reflectors can be employed to correct for possible effects of system temperature fluctuations. As is evident in FIG. 1, a portion of the output light beam travels along the reference fiber 38 from the coupler to the one or more reference wavelength reflectors. The reference fiber 38 carries the reference light signals back to the coupler. The output fiber 40 transports a portion of the reference light signals from the coupler to the electronics 16. The light sensor 46 receives the portion of the reference light signals transported by the output fiber 40.

Since the light sensor 46 receives the portion of the reference light signals transported by the output fiber 40, the encoded electrical signal is a function of the reference light signals in addition to being a function of the reflected light signals. In some instances, the encoded electrical signal is a function of the reference light signals, and the broadband reflection signals in addition to being a function of the reflected light signals. The electronics 16 employ the modulation signals in combination with standard processing techniques, as described above, to extract the power of each reference light signal from the encoded electrical signal and/or to extract the relative powers of reference light signals from the encoded electrical signal. Accordingly, the electronics can determine the power ratio of particular reference signals. The electronics can compare the determined power ratio to the relationship between the power ratio and the characteristic wavelength to determine the characteristic wavelength of a particular reference wavelength reflector. Hence, the electronics can determine the characteristic wavelength for one or more of the reference wavelength reflectors.

The electronics 16 can employ the broadband reflection signals to remove or reduce the effect of broadband reflections from the power ratio of a reference wavelength reflector as disclosed above for non-reference wavelength reflectors. For instance, the power ratio can be determined as the ratio of: (the power of one light signal after being reflected minus the broadband reflection power):(the power of another light signal after being reflected minus the broadband reflection power). As noted above, the broadband reflection power can be the same or different for each of the light signals.

A reference wavelength reflector can be stabilized with respect to the one or more unwanted external influences. For instance, when the unwanted external influence is temperature, the reference wavelength reflectors can be athermal in that the temperature of the reference wavelength reflector remains substantially fixed despite changes to the temperature of the sensing system. An athermal reference wavelength reflector can be generated through the use of packaging and/or temperature control devices and/or temperature control systems. Additionally, the reference wavelength reflectors can be protected from other external influences. The other external influences can include or consist of external influences being measured by the sensing system. In some instances, the reference wavelength reflectors are positioned in a container along with the electronics. As a result, changes to the measured characteristic wavelength of the reference wavelength reflector are a result of changes in the unwanted external influence on the portion of the sensing system that excludes the reference wavelength reflector. Hence, these changes indicate the effects of the unwanted external influence on the results for the non-reference wavelength reflectors.

The relationships that are employed to determine the characteristic wavelengths for the non-reference wavelength reflectors can each be associated with a particular level of the unwanted external influence. For instance, these relationships may have all been determined at room temperature. The value of the characteristic wavelength for each reference wavelength reflector at the particular level of the unwanted external influence can be known and can serve as a reference wavelength. For instance, the characteristic wavelength for each reference wavelength reflector at room temperature can serve as a reference wavelength.

The electronics can subtract the reference wavelength for a particular reference wavelength reflector from the characteristic wavelength determined for that reference wavelength reflector to determine the shift in the characteristic wavelength that results from the effects of the unwanted external influence on the sensing system. The wavelength shift may be subtracted from the characteristic wavelengths determined for the non-reference wavelength reflectors to correct the characteristic wavelengths determined for these wavelength reflectors for the effects of the unwanted external influence.

The reference wavelength reflectors can be employed to determine wavelength shifts from different unwanted influences. In these instances, it may be desirable to add the wavelength shift for correcting the characteristic wavelengths of the non-reference wavelength reflectors. When more than one reference wavelength reflector measures the wavelength shift resulting from the same unwanted external influence, the wavelength shift for different reference wavelength reflectors may be the same or different. In the event that they are different, the wavelength shift employed to correct the characteristic wavelength determined for different non-reference wavelength reflectors can be different. For instance, the wavelength shift for a non-reference wavelength reflector operating at a particular wavelength can be determined by interpolating between the wavelength shifts determined for the different reference wavelength reflectors.

The characteristic wavelength of a wavelength reflector can be related to a variety of different external influences. For instance, the characteristic wavelength of a wavelength reflector can change as a function of the temperature, stress, strain, or pressure. Additionally, the characteristic wavelength of a wavelength reflector can be related to changes in materials that are adjacent to the wavelength reflector. As an example, the characteristic wavelength of a Bragg Grating can be related to the index of refraction and/or pH of a solution adjacent to wavelength reflector. Since the characteristic wavelength can be related to these external influences, the power ratio can be related to these external influences. As a result, the electronics can compare the power ratio to one of these relationships in order to determine the level of these external influences. Since these relationships are between the power ratio and the level of the external influence, it may not be necessary to actually determine the characteristic wavelength of a wavelength reflector in determining the level of an external influence. Further, the determined level of an external influence can be corrected for an unwanted external influence by using the method described above to determine the shift in the external influence that results from unwanted external influence. The shift in the external influence can then be subtracted from the determined level of the external influence to correct for the unwanted external influence.

Although the function of the electronics 16 is disclosed as employing the power of the reflected light signals in determining the characteristic wavelength of a wavelength reflector and/or the level of an external influence on the wavelength reflector, the electronics 16 can use other variables that indicate the power of the reflected light signal in place of the power. Additionally or alternately, the electronics 16 can employ other variables that are related to the power of the reflected light signal. For instance, as noted above, the amplitude of the electrical signal can be related to the power of a reflected light signal. Because the power of a reflected light signal can be related to the characteristic wavelength and/or the level of an external influence, the amplitude of a demodulated electrical signal can be related to the characteristic wavelength and/or the level of an external influence. The amplitude of one or more demodulated electrical signals or a ratio of these amplitudes can be compared to this relationship to determine the level of external influence on the wavelength reflector. Accordingly, the actual power of the reflected light signals need never be determined.

As noted above, a phase delay may occur between the modulation signal and the electrical signals that are each associated with a different light signal. Since the amount of the phase delay for a particular wavelength reflector will change as a function of the distance between the electronics and the wavelength reflector, the electronics can employ this phase delay to approximate the distance between each wavelength reflector and the electronics. Accordingly, the electronics can also employ this phase delay to approximate the distance between the wavelength reflectors. This may be useful in applications where the wavelength reflectors are not readily visible. For instance, this function may be useful when the wavelength reflectors are embedded in a structure for monitoring of the strain on the structure.

The sensing system can optionally include components in addition to the components disclosed above. For instance, the sensing system can include an optical connector 48 as illustrated in FIG. 1. The optical connector 48 permits the secondary sensor fiber 37 to be easily changed. As a result, the selection of wavelength reflectors on the secondary sensor fiber 37 can be changed by changing the secondary sensor fiber 37.

The reference wavelength reflectors are optional. As a result, in some instances, the sensing system does not include the reference fiber and/or the reference fiber. Additionally, the sensing system need not generate or employ reference light signals. Additionally or alternately, the broadband reflection signals are optional. As a result, in some instances, the sensing system does not generate or employ broadband reflection signals.

Although the above discussion of light signal modulation is disclosed in the context of amplitude based modulation of the light signals, the modulation schemes can be adapted for use with other light signal modulation techniques such as phase based modulation of the light signals or frequency based modulation of the light signals. Accordingly, the modulators 24 can be frequency modulators 24 or phase modulators 24.

Figure 3A:
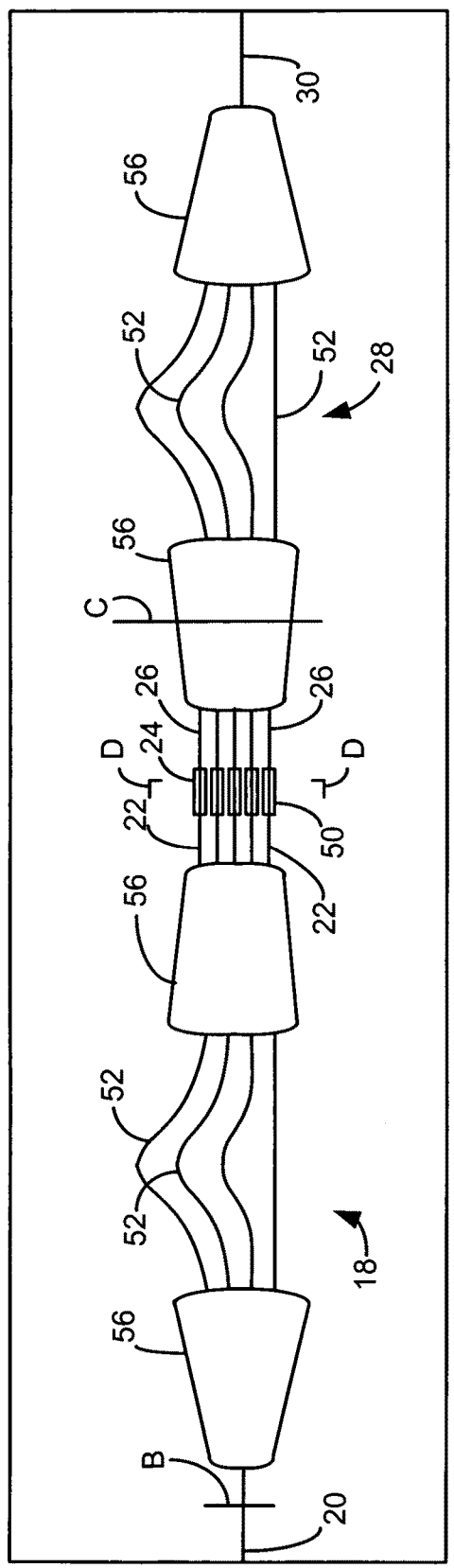
FIG. 3A is a schematic diagram of an optical device where the optical components, optical fiber components, and electronics are integrated onto a single optical device. The optical device includes waveguides, light distributors and modulators.

Each of the components in the optical component 12 of FIG. 1 can be on separate optical devices. For instance, the demultiplexer 18, modulators 24, and multiplexer 28 can be on different optical devices. Alternately, a portion of the components can be integrated on the same optical device. When the components are positioned on different devices, optical fibers can be employed to provide optical communication between the different optical devices. In some instances, all of the components can be integrated onto a single optical device. FIG. 3A presents a schematic diagram where each of the components are integrated onto a single optical device. The optical device includes an arrayed waveguide grating demultiplexer 18, a plurality of variable optical attenuators 50 that can each serve as a modulator, and an arrayed waveguide grating multiplexer 28. The optical device includes a plurality of waveguides including an input waveguide 20, array waveguides 52, uncoded signal waveguides 22, encoded signal waveguides 26, and output waveguides 30. The multiplexer 28 and the demultiplexer 18 include an array waveguide grating extending between light distribution components 56 that are each configured to distribute light signals received from one or more locations on an input side to one or more locations on an output side. Suitable light distribution components include, but are not limited to, slab waveguides, star couplers, Roland circles and free space regions.

Figure 3B:
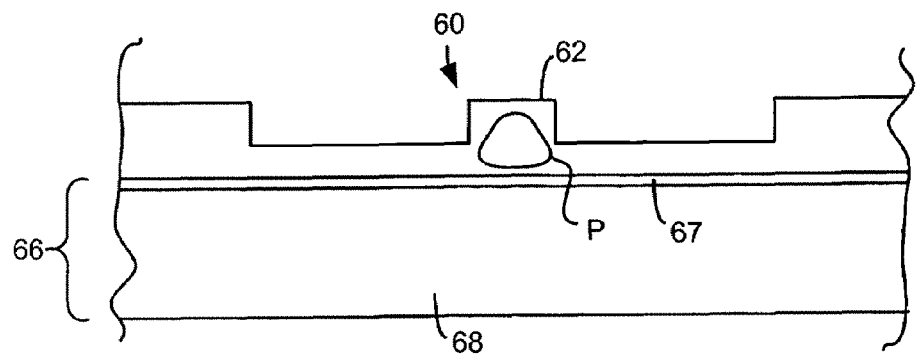
FIG. 3B is a cross section of a portion of an optical device having a waveguide suitable for use as a waveguide in the optical device illustrated in FIG. 3A.

FIG. 3B is a cross section of a portion of an optical device having a waveguide 60. The waveguide 60 is suitable for use as the waveguides in the optical device illustrated in FIG. 3A. For instance, FIG. 3B could be a cross section of the optical device shown in FIG. 3A taken along the line labeled B. The waveguide 60 is defined by a ridge 62 extending from a slab of light transmitting medium 64 positioned on a base 66. Suitable light transmitting media include, but are not limited to, silicon, polymers, silica, SIN, GaAs, InP and LiNbO$_3$. The portion of the base 66 adjacent to the light transmitting medium 64 constrains the light signals within the waveguide 60. A suitable base 66 for use with a silicon light transmitting medium 64, includes but is not limited to, a layer of silica 67 over a silicon substrate 68. The line labeled P in FIG. 3B illustrates the profile of the fundamental mode for a light signal carried in the waveguide 60. When the light transmitting medium 64 is silicon, and the base 66 includes a layer of silica over a silicon substrate, the optical device can be constructed from a silicon-on-insulator wafer.

Figure 3C:
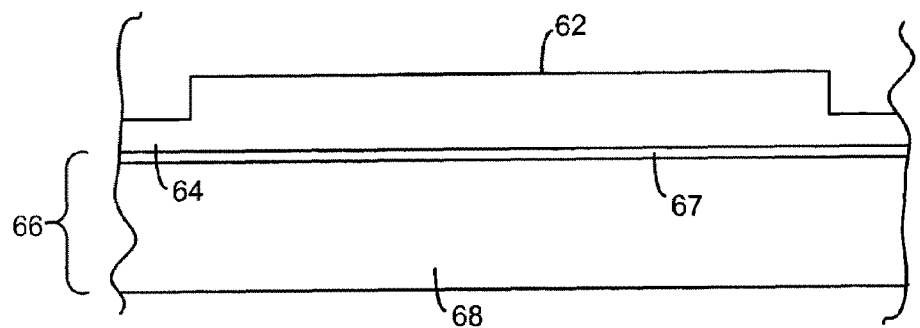
FIG. 3C is a cross section of a portion of an optical device having a light distribution component. The light distribution component is suitable for use as a light distribution component in the optical device illustrated in FIG. 3A.
Figure 3C:
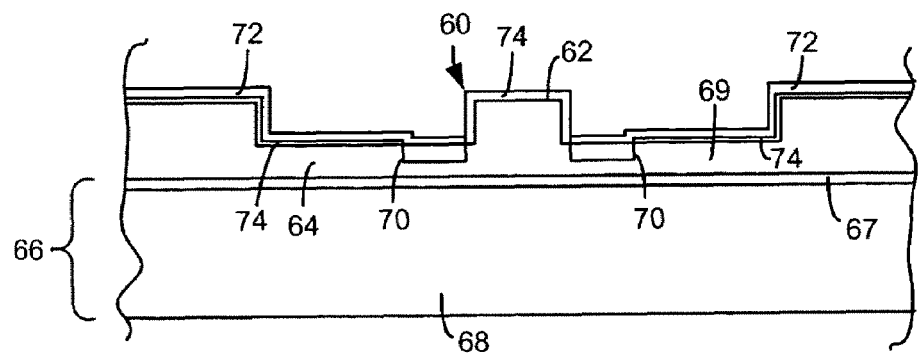

FIG. 3C is a cross section of a portion of an optical device having a light distribution component. The light distribution component is suitable for use as a light distribution component in the optical device illustrated in FIG. 3A. For instance, FIG. 3C could be a cross section of the optical device shown in FIG. 3A taken along the line labeled C. The light distribution component is defined by the ridge 62 extending from the slab of light transmitting medium 64.

FIG. 3D is a cross section of a portion of an optical device having an optical attenuator. The attenuator is suitable for use as a modulator 24 in the optical device illustrated in FIG. 3A. For instance, FIG. 3D could be a cross section of a modulator 24 in FIG. 3A taken along a line extending between the brackets labeled D in FIG. 3A. The attenuator is positioned along the waveguide 60 defined by the ridge 62 extending from the slab of light transmitting medium 64 positioned on a base 66. Doped regions 70 are formed on opposing sides of the ridge 62. One of the doped regions 70 includes a P-type material and one of the doped regions 70 includes an N-type material. When the light transmitting medium 64 is silicon, suitable dopants include, but are not limited to, boron and phosphor. Electrical conductors 72 are formed on each doped region 70 and can extend to electrical pads (not shown) positioned elsewhere on the optical device. The pads can be used to provide the electrical connections to the electronics 16. Suitable electrical conductors 72 include, but are not limited to, metal traces. A passivation layer 74 can be positioned between the electrical conductors 72 and the light transmitting medium 64 and/or over the waveguide 60. When the optical device is constructed on a silicon-on-insulator wafer, suitable passivation layers 74 include, but are not limited to, silica. Electrical energy can be applied to the electrical conductors 72 so as to inject carriers into the waveguide 60. Free carrier absorption provides optical attenuation of a light signal traveling through the waveguide 60.

Although the passivation layer 74 is illustrated as being positioned on the attenuator, the passivation layer 74 can be on other components of the optical device. For instance, the passivation layer 74 can be positioned on waveguides, the multiplexer and/or the demultiplexer. Although the doped regions 70 are shown extending part way through the light transmitting medium 64, the doped regions 70 can extend through the light transmitting medium 64 to the base 66. Extending the doped regions 70 further toward the base 66 can increase the efficiency of the attenuator by constraining additional carriers between the doped regions 70.

An optical device according to FIG. 3A through FIG. 3D can be generated from a wafer such as a silicon on insulator wafer. The ridges 62 for the waveguides and other components can be concurrently formed by masking the region of the wafer where the ridges 62 are to be formed and etching to the desired ridge 62 depth. The doped regions 70, electrical conductors 72, and passivation layers 74 associated with at least the attenuator can be formed with traditional integrated circuit fabrication techniques.

Additional attenuator and optical device constructions are provided in U.S. patent Ser. No. 10/371,642, filed on Feb. 21, 2003, entitled "Attenuator Having Reduced Optical Loss in the Pass Mode," now U.S. Pat. No. 6,853,793; and in U.S. patent Ser. No. 10/649,044, filed on Aug. 27, 2003, entitled "Optical Component Having Reduced Interference from Radiation Modes;" and in U.S. patent Ser. No. 11/147,403, filed on Jun. 7, 2005, entitled "High Speed Optical Intensity Modulator;" each of which is incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A sensing system, comprising:
a plurality of modulators that are each configured to modulate a different light signal;
one or more optical pathways configured to transport the modulated light signals to one or more wavelength reflectors, each wavelength reflector being configured to reflect a portion of the modulated light signals at a characteristic wavelength that is a function of an influence external to the wavelength reflector; and
a light sensor configured to receive the reflected light signals and to output a modulated electrical signal that is a function of the power of each of the reflected light signals;
wherein one or more of the modulated light signals has a range of wavelengths that does not overlap the characteristic wavelength range for any of the wavelength reflectors.

2. The sensing system of claim 1, wherein the wavelength reflector is a Bragg grating on an optical fiber.

3. The sensing system of claim 1, further comprising:
electronics configured to employ the modulated electrical signal from the light sensor so as to determine one or more results selected from a group consisting of: the characteristic wavelength of one or more of the wavelength reflectors and a level of the external influence for one or more of the wavelength reflectors.

4. The sensing system of claim 3, wherein the electronics are:
configured to apply a different modulation signal to each of the modulators so as to modulate the different light signals; and
configured to employ the modulated electrical signal so as to determine the one or more results.

5. The sensing system of claim 1, wherein the one or more optical pathways are configured to transport the modulated light signals to more than one of the wavelength reflectors and further comprising:
electronics configured to employ the modulated electrical signal from the light sensor so as to determine a variable or set of variables that indicate the absolute or relative power levels of two or more of the reflected light signals.

6. The sensing system of claim 5, wherein the variable is a function of a ratio of a function of a power of one of the reflected light signals: a function of a power of another of the reflected light signals.

7. The sensing system of claim 5, wherein the variable is function of the frequency, amplitude, and/or phase of the electrical signal.

8. The sensing system of claim 5, wherein the electronics are configured to employ the modulated electrical signal from the light sensor so as to determine a variable that indicates a temperature of one or more of the wavelength reflectors.

9. The sensing system of claim 1, further comprising:
electronics configured to employ the modulated electrical signal from the light sensor so as to determine one or more results selected from a group consisting of: the characteristic wavelength of one or more of the wavelength reflectors and a level of the external influence on one or more of the wavelength reflectors;
electronics configured to employ the modulated electrical signal from the light sensor so as to correct the one or more results for variations in an unwanted external influence.

10. The sensing system of claim 1, further comprising:
electronics configured to employ the modulated electrical signal from the light sensor so as to determine the characteristic wavelength of one or more of the wavelength reflectors.

11. The sensing system of claim 1, further comprising:
electronics configured to employ the modulated electrical signal from the light sensor so as to determine a variable that indicates a power level for one or more light signals having a range of wavelengths that does not fall within the characteristic wavelength range for any of the wavelength reflectors.

12. A sensing system comprising:
a demultiplexer configured to receive light that includes light signals and demultiplex the light signals;
a plurality of modulators, each modulator being configured to modulate a different one of the light signals so as to generate a modulated light signal;
a multiplexer configured to multiplex the modulated light signals;
an optical fiber component having one or more wavelength reflectors that receive the multiplexed light signals, each wavelength reflector being configured to reflect a portion of the modulated light signals at a characteristic wavelength that is a function of an influence external to the wavelength reflector;
a light sensor configured to receive the reflected light signals and to output a modulated electrical signal that is a function of the power of each of the reflected light signals; and
electronics configured to apply a different modulation signal to each of the modulators to modulate the light signals, and also being configured to employ the modulated electrical signal from the light sensor so as to determine one or more results selected from a group consisting of: the characteristic wavelength of one or more of the wavelength reflectors and a level of the external influence on one or more of the wavelength reflectors;
wherein the demultiplexer, the modulators, and the multiplexer are each on the same silicon-on-insulator chip, the silicon-on-insulator chip having a layer of silicon and the light signals traveling through the layer of silicon as the light signals travel through the demultiplexer, the modulators, and the multiplexer.

13. The system of claim 12, wherein the wavelength reflectors are each a Bragg grating.

14. The system of claim 12, wherein the external influence is a strain.

15. The system of claim 12, wherein the optical fiber component has more than one of the wavelength reflectors and further comprising:

electronics configured to employ the modulated electrical signal from the light sensor so as to determine a variable or set of variables that indicate the absolute or relative power levels of two or more of the reflected light signals.

16. The system of claim 15, wherein the variable is a function of a ratio of a function of a power of one of the reflected light signals: a function of a power of another of the reflected light signals.

17. The system of claim 15, wherein the electronics are configured to employ the modulated electrical signal from the light sensor so as to determine a variable that indicates a temperature of one or more of the wavelength reflectors.

18. The system of claim 17, further comprising:
electronics configured to employ the modulated electrical signal from the light sensor so as to correct the one or more results for variations in an unwanted external influence.

19. The system of claim 12, wherein one or more of the light signals has a range of wavelengths that does not fall within the characteristic wavelength range for any of the wavelength reflectors.

20. The system of claim 12, wherein the electronics are configured to employ the modulated electrical signal from the light sensor so as to determine the characteristic wavelength of one or more of the wavelength reflectors.

21. The system of claim 12, wherein the electronics are configured to employ the modulated electrical signal from the light sensor so as to determine a variable that indicates a power level for one or more light signals having a range of wavelengths that does not fall within the characteristic wavelength range for any of the wavelength reflectors.

22. The system of claim 12, wherein the demultiplexer and the multiplexer are each an array waveguide grating.

* * * * *